UNITED STATES PATENT OFFICE.

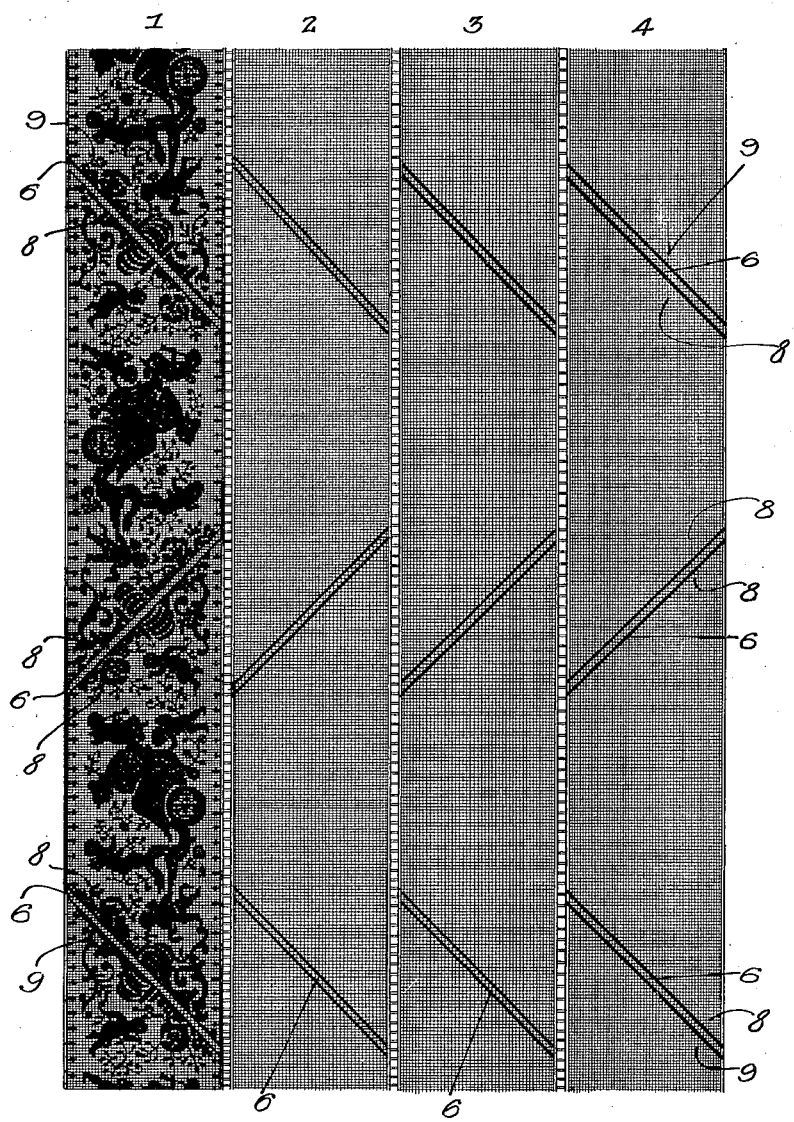

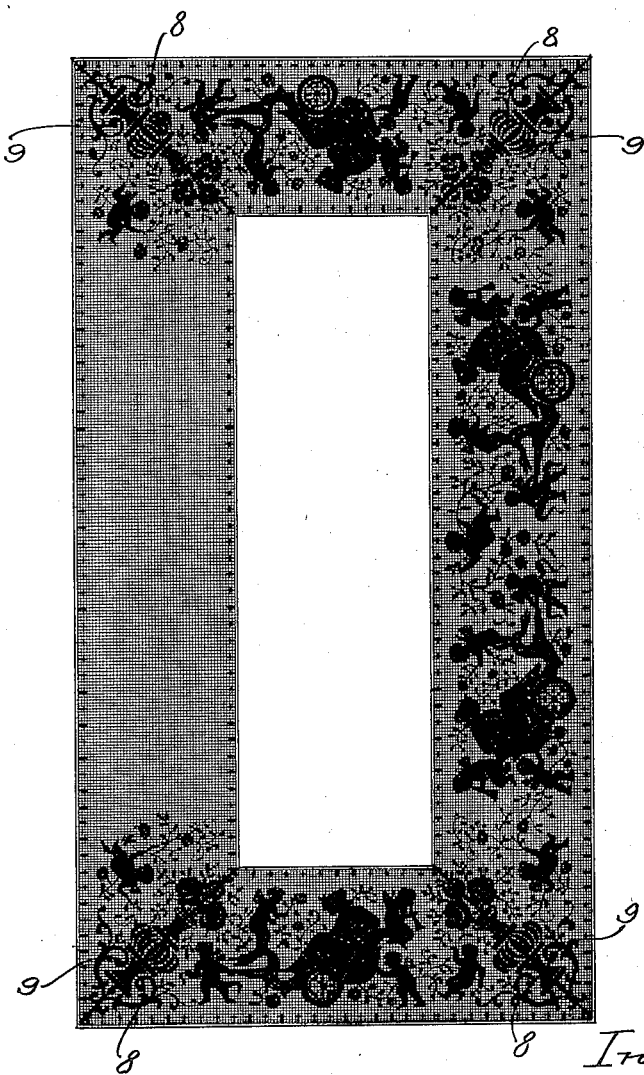

JAMES WATERFIELD, OF PHILADELPHIA, PENNSYLVANIA, ASSIGNOR TO QUAKER LACE COMPANY, OF PHILADELPHIA, PENNSYLVANIA, A CORPORATION OF PENNSYLVANIA.

FABRIC.

1,335,627.   Specification of Letters Patent.   Patented Mar. 30, 1920.

Application filed July 26, 1916. Serial No. 111,391.

*To all whom it may concern:*

Be it known that I, JAMES WATERFIELD, a citizen of the United States, residing in Philadelphia, Pennsylvania, have invented a Fabric, of which the following is a specification.

One object of my invention is to avoid the waste of material which has hitherto been incident upon the manufacture of rectangular fabric articles such as bureau scarfs, table covers and the like which are made of or edged with bodies of lace, due to the necessity or desirability of continuing or properly matching the pattern of the lace through the miters at the corners of said article.

A further object of the invention is to provide a fabric which shall include as part of its design or which shall have its pattern so disposed as to provide, inclined guide lines or spaces, along which each two adjacent sections of said fabric may be cut in order to provide mitering edges bearing a predetermined relation to the pattern; the guide lines or spaces being placed in the fabric at predetermined or definite distances apart so that there shall be no waste in making up the finished article.

These objects and other advantageous ends I secure as hereinafter set forth, reference being had to the accompanying drawings, in which, Figure 1 is a fragmentary plan of a body of lace woven according to my invention, the ornamental pattern being omitted from all but one of the lengths in order to emphasize the section-defining lines; and Fig. 2 is a plan of a bureau scarf made in accordance with said invention.

In the lace making art, a number of parallel lengths or sections of lace edging, each complete in itself and having its own pattern, are usually woven as a single wide body, after which said sections are cut apart. In making up a bureau scarf or other geometrically shaped article which is to be edged with lace made of such sections, a greater or less amount thereof is almost certainly wasted in so cutting them that the pattern is continued through or properly matched at the corners of said article.

In carrying out my invention, the pattern mechanism of the loom on which the lace is woven is so designed and adjusted that the body of lace is not only woven in the form of a piece composed of a number of parallel lengths or sections, but each of these sections is so woven or has its pattern so disposed that narrow, elongated spaces defining inclined cutting lines are provided or indicated at suitable intervals.

Moreover these inclined miter lines or spaces bear a definite relation to the pattern or figure on the lace strips or sections, so that after the latter are cut out of the single original piece, they may be cut along said lines and sewed together as required to edge or form any desired article; their inclined ends being likewise sewed together so that the parts of the pattern shall be properly continued or disposed when the article is in its finished form.

In Fig. 1, I have illustrated a body of lace woven in the form of a number of parallel lengths or sections 1, 2 and 3, and in addition to the ornamental pattern with which each of these sections is provided, it has its threads so disposed as to define or indicate inclined miter lines 6 at suitable, predetermined distances apart; it being noted that said lines are arranged in a definite, constant manner with regard to the pattern or figure with which the lace is woven. If now the various strips 1, 2 and 3 be cut apart along the longitudinal lines separating them, each may in turn be separated into a number of sections by cutting it along its inclined lines 6, and after one of the two ends as 8, of adjacent sections has been turned up-side-down relative to the other, its inclined edge may be sewed or otherwise attached to the corresponding inclined edge of the end 9, so that the one of the sections extends at right angles to the other and has its pattern perfectly matched with or continued through the miter joint so formed.

Since the various sections of each strip are made of predetermined lengths between their inclined ends, depending upon the use for which they are originally designed, the matching and joining of the ends as above noted will provide a series of rectangular lace borders which may be sewed to a central body of material or may themselves constitute a rectangular body of lace mitered along lines running from its corners to its center. In any case the pattern of the lace extends through or bears a definite and pleasing relation to the mitered joints and in no instance is there any waste of material due to the discarding of odd lengths.

I claim:

A new article of manufacture consisting of a body of lace made up of a series of sections each having a pattern and inclined cut-guiding lines dividing the pattern into portions disposed to form a continuous design when the parts of the lace body formed by cutting on said lines are again united so as to extend at an angle to each other.

JAMES WATERFIELD.